(12) United States Patent
Bhatnagar et al.

(10) Patent No.: US 8,673,198 B2
(45) Date of Patent: Mar. 18, 2014

(54) METHOD OF MAKING IMPROVED BALLISTIC PRODUCTS

(75) Inventors: Ashok Bhatnagar, Richmond, VA (US);
Lori L. Wagner, Richmond, VA (US);
David A. Hurst, Richmond, VA (US);
Brian D. Arvidson, Chester, VA (US)

(73) Assignee: Honeywell International Inc, Morristown, NJ (US)

( * ) Notice: Subject to any disclaimer, the term of this patent is extended or adjusted under 35 U.S.C. 154(b) by 1725 days.

(21) Appl. No.: 11/357,482

(22) Filed: Feb. 18, 2006

(65) Prior Publication Data

US 2007/0194490 A1 Aug. 23, 2007

(51) Int. Cl.
*B27N 3/10* (2006.01)

(52) U.S. Cl.
USPC ........................................... 264/257

(58) Field of Classification Search
USPC ................ 264/258, 324, 257; 442/239
See application file for complete search history.

(56) References Cited

U.S. PATENT DOCUMENTS

| | | | |
|---|---|---|---|
| 3,671,542 A | 6/1972 | Kwolek et al. | 524/157 |
| 4,623,574 A | 11/1986 | Harpell et al. | 428/113 |
| 4,737,402 A | 4/1988 | Harpell et al. | 442/187 |
| 4,748,064 A | 5/1988 | Harpell et al. | 428/113 |
| 4,916,000 A | 4/1990 | Li et al. | 428/105 |
| 5,167,876 A | 12/1992 | Lem et al. | 252/602 |
| 5,173,138 A | 12/1992 | Blauch et al. | 156/177 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,196,252 A | 3/1993 | Harpell et al. | 428/102 |
| 5,471,906 A | 12/1995 | Bachner, Jr. et al. | 89/36.05 |
| 5,677,029 A | 10/1997 | Prevorsek et al. | 428/113 |
| 5,690,526 A * | 11/1997 | Lin et al. | 442/59 |
| 5,766,725 A | 6/1998 | Hogenboom et al. | 428/113 |
| 6,183,834 B1 | 2/2001 | van der Loo | 428/107 |
| 6,219,842 B1 | 4/2001 | Bachner, Jr. | 2/2.5 |
| 6,248,676 B1 | 6/2001 | Dischler | 442/217 |
| 6,268,301 B1 | 7/2001 | Dalman et al. | 442/101 |
| 6,893,704 B1 | 5/2005 | van der Loo | 428/107 |
| 7,687,412 B2 | 3/2010 | Bhatnagar et al. | |

FOREIGN PATENT DOCUMENTS

| | | |
|---|---|---|
| EP | 0585793 | 3/1994 |
| EP | 0645415 | 3/1995 |
| JP | 2005-289056 A | 10/2005 |
| WO | WO9108895 | 6/1991 |
| WO | WO0029468 | 5/2000 |
| WO | W02007097780 | 8/2007 |

OTHER PUBLICATIONS

Dennis, H.W. et al. "Technological Advantages of Polyether Copolymer Based TPUs (for Extrusion and Injection Moulding End-Uses)." PU Latin America; Barcelona, Spain; Aug. 28-30, 2001; pp. 1-11; www.merquinsa.com/literature/pulatinamerica_English.pdf.

* cited by examiner

*Primary Examiner* — Larry Thrower

(57) ABSTRACT

A method of making a ballistic resistant composite material having improved resistance to high energy rifle bullets and the like. The method comprises providing at least one fibrous layer comprising a network of high tenacity aramid fibers. The fibrous layer is coated with a thermoplastic polyurethane resin. The coated fibrous layer is molded at a pressure of at least about 1,500 psi (10.3 MPa).
Preferably, a plurality of fibrous layers are employed, each of which is formed from unidirectionally oriented aramid fibers in a thermoplastic polyurethane resin matrix. Adjacent fibrous layers are preferably oriented at 90° with respect to each other.

28 Claims, No Drawings

METHOD OF MAKING IMPROVED BALLISTIC PRODUCTS

BACKGROUND OF THE INVENTION

1. Field of the Invention

This invention relates to ballistic products, in particular to ballistic products formed from aramid fibrous material.

2. Description of the Related Art

Ballistic resistant products for vests and the like are known in the art. Many of these products are based on high tenacity fibers, such as aramid fibers. Although such products have excellent properties and have achieved commercial success, there is a constant need to improve the properties of armor products, such as body armor products.

In particular, it would be desirable to provide ballistic resistant products which had improved resistance to high energy rifle bullets and the like.

SUMMARY OF THE INVENTION

In accordance with this invention, there is provided a method of making a ballistic resistant composite material having improved resistance to high energy rifle bullets and the like, the method comprising providing at least one fibrous layer comprising a network of high tenacity aramid fibers; coating the fibrous layer with a thermoplastic polyurethane resin; and molding the fibrous layer at a pressure of at least about 1,500 psi (10.3 MPa).

This invention also provides a method for making a ballistic resistant composite material having improved resistance to high energy rifle bullets and the like, the method comprising providing a first fibrous layer comprising a network of high tenacity aramid fibers; coating the first fibrous layer with a thermoplastic polyurethane resin; providing a second fibrous layer comprising a network of high tenacity aramid fibers; coating the second fibrous layer with a thermoplastic polyurethane resin; and molding the first and second fibrous layers at a pressure of at least about 1,500 psi (10.3 MPa).

In addition, this invention provides a method for making a ballistic resistant composite material having improved resistance to high energy rifle bullets and the like, the method comprising providing a first non-woven fibrous layer comprising a network of high tenacity aramid fibers; coating the first non-woven fibrous layer with a thermoplastic polyurethane resin; providing a second non-woven fibrous layer comprising a network of high tenacity aramid fibers; coating the second non-woven fibrous layer with a thermoplastic polyurethane resin; arranging the first and second non-woven fibrous layers such that the first and second non-woven fibrous are oriented with respect to each other; and molding the first and second fibrous layers at a pressure of at least about 1,500 psi (10.3 MPa).

This invention further provides a method of improving the resistance of a ballistic resistant body armor to high energy rifle bullets and the like, the method comprising providing a first fibrous layer comprising a network of high tenacity aramid fibers; coating the first fibrous layer with a thermoplastic polyurethane resin; providing a second fibrous layer comprising a network of high tenacity aramid fibers; coating the second fibrous layer with a thermoplastic polyurethane resin; molding the first and second fibrous layers at a pressure of at least about 1,500 psi (10.3 MPa) to form a molded article; and forming the body armor at least in part from the molded article.

It has been surprisingly discovered that when a thermoplastic polyurethane resin is used to form a composite aramid fibrous structure and the composite is formed under high pressure, the composite has improved ballistic resistance to high energy rifle bullets and the like. This is especially unexpected since similar results have not been seen with aramid composites that utilize other known coating resins.

DETAILED DESCRIPTION OF THE INVENTION

The present invention relates to composites formed from aramid fibers which have improved ballistic resistance, especially to high energy rifle bullets. These composites are particularly useful in ballistic resistant armor articles, both flexible or rigid. Examples include body armor, helmets, blankets and the like.

High energy rifle bullets are bullets where the energy level generally is from about 1500 to about 3500 joules, or higher. Examples of such bullets are the M80 ball (also known as the NATO ball, the Dragnov LPS, and the like.

For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

As used herein, the term "high tenacity fibers" means fibers which have tenacity equal to or greater than about 7 g/d. These fibers preferably have initial tensile moduli of at least about 150 g/d and energies-to-break of at least about 8 J/g as measured by ASTM D2256. Preferred fibers are those having a tenacity equal to or greater than about 10 g/d, a tensile modulus equal to or greater than about 200 g/d and an energy-to-break equal to or greater than about 20 J/g. Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 500 g/d, and the energy-to-break is equal to or greater than about 27 J/g. As used herein, the terms "initial tensile modulus", "tensile modulus" and "modulus" mean the modulus of elasticity as measured by ASTM 2256 for a yarn and by ASTM D638 for a matrix material.

Aramid fibers are known in the art. Suitable aramid fibers useful in the present invention are formed from aromatic polyamides, such as those are described in U.S. Pat. No. 3,671,542 the disclosure of which is expressly incorporated herein by reference to the extent not inconsistent herewith. Preferred aramid fibers will have a tenacity of at least about 20 g/d, an initial tensile modulus of at least about 200 g/d and an energy-to-break at least about 8 J/g, and particularly preferred aramid fibers will have a tenacity of at least about 20 g/d, an initial tensile modulus of at least about 400 g/d and an energy-to-break of at least about 20 J/g.

Most preferred aramid fibers will have a tenacity of at least about 23 g/d, a modulus of at least about 500 g/d and an energy-to-break of at least about 30 J/g. For example, poly (p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d and Kevlar® 49 which has 1000 g/d and 22 g/d as values of initial tensile modulus and tenacity, respectively, both available from du Pont. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers produced commercially by du Pont under the trade name Nomex®.

The fibers may be of any suitable denier, such as, for example, about 50 to about 3000 denier, more preferably from about 200 to about 3000 denier, still more preferably from about 650 to about 1500 denier, and most preferably from about 800 to about 1300 denier.

The aramid fibers are formed into at least one layer of a fibrous network. Preferably the fibrous network is a non-woven fabric, although other types of fabrics may be employed herein, such as woven or knitted fabrics. In the case of woven fabrics, they may be woven with yarns having different fibers in the warp and weft directions, or in other directions.

Preferably there are at least two layers of fibrous networks used to prepare the ballistic resistant composites.

A particularly preferred configuration of the fibers is in a network wherein the fibers are unidirectionally aligned so that they are substantially parallel to each other along a common fiber direction. Alternatively, a non-woven fabric may be used in which the fibers are felted in a random orientation.

Preferably, at least about 50% by weight of the fibers in the non-woven fabric are high tenacity aramid fibers, more preferably at least about 75% by weight of the fibers in the fabric are high tenacity aramid fibers, and most preferably substantially all of the fibers in the fabric are high tenacity aramid fibers. The yarns may be in essentially parallel alignment, or the yarns may be twisted, over-wrapped or entangled.

Fabrics formed from unidirectionally oriented fibers typically have one layer of fibers which extends in one direction and a second layer of fibers which extends in another direction (preferably 90°) from the fibers in the first layer. Where the individual plies are unidirectionally oriented fibers, the successive plies are preferably rotated relative to one another, for example at angles of 0°/90°, 0°/90°/0°/90°, or 0°/45°/90°/45°/0° or at other angles.

It is convenient to characterize the geometries of the composites of the invention by the geometries of the fibers. One such suitable arrangement is a fibrous layer in which the fibers are aligned parallel to one another along a common fiber direction (referred to as a "unidirectionally aligned fiber network"). Successive layers of such unidirectionally aligned fibers can be rotated with respect to the previous layer. Preferably, the fibrous layers of the composite are cross-plied, that is, with the fiber direction of the unidirectional fibers of each network layer rotated with respect to the fiber direction of the unidirectional fibers of the adjacent layers. An example is a five layer article with the second, third, fourth and fifth layers rotated +45°, −45°, 90° and 0° with respect to the first layer. A preferred example includes two layers with a 0°/90° layup. Such rotated unidirectional alignments are described, for example, in U.S. Pat. Nos. 4,623,574; 4,737,402; 4,748,064; and 4,916,000.

In general, the fibrous layers of the invention are preferably formed by constructing a fiber network initially and then coating the network with a matrix composition. As used herein, the term "coating" is used in a broad sense to describe a fiber network wherein the individual fibers either have a continuous layer of the matrix composition surrounding the fibers or a discontinuous layer of the matrix composition on the surface of the fibers. In the former case, it can be said that the fibers are fully embedded in the matrix composition. The terms coating and impregnating are interchangeably used herein. The fiber networks can be constructed via a variety of methods. In the preferred case of unidirectionally aligned fiber non-woven fibrous networks, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The method of this invention includes initially forming the fiber network layer, preferably a unidirectional network as described above, applying a solution, dispersion or emulsion of the matrix composition onto the fiber network layer, and then drying the matrix-coated fiber network layer. The solution, dispersion or emulsion is preferably an aqueous solution of the polyurethane resin, which may be sprayed onto the filaments. Alternatively, the filament structure may be coated with the aqueous solution, dispersion or emulsion by dipping or by means of a roll coater or the like.

After coating, the coated fibrous layer may then be passed through an oven for drying in which the coated fiber network layer (unitape) is subjected to sufficient heat to evaporate the water in the matrix composition. The coated fibrous network may then be placed on a carrier web, which can be a paper or a film substrate, or the fibers may initially be placed on a carrier web before coating with the matrix resin. The substrate and the unitape can then be wound into a continuous roll in a known manner.

The unitape can be cut into discrete sheets and laid up into a stack for formation into the end use composite. As mentioned previously, the most preferred composite is one wherein the fiber network of each layer is unidirectionally aligned and oriented so that the fiber directions in successive layers are in a 0°/90° orientation.

In the most preferred embodiment, two fiber network layers are cross-plied in a 0°/90° configuration and then consolidated to form a sub-assembly precursor. The two fiber network layers can be continuously cross-plied, preferably by cutting one of the networks into lengths that can be placed successively across the width of the other network in a 0°/90° orientation. Equipment for the continuous cross-plying of fibrous layers is known, such as is described, for example, in U.S. Pat. Nos. 5,173,138 and 5,766,725. The resulting continuous two-ply sub-assembly can then be wound into a roll with a layer of separation material between each ply. The individual laminae of the composite may be adhered to each other by contact, or under the application of heat and no, or relatively, low pressure.

As mentioned above, the high tenacity fibers of each layer are coated with the matrix composition and then the matrix composition/fiber combination is consolidated. By "consolidating" is meant that the matrix material and the fibrous layer are combined into a single unitary layer. Consolidation can occur via drying, cooling, heating, relatively low pressure or a combination thereof.

In an alternate embodiment, a four-ply sub-assembly is formed wherein successive layers are oriented in a 0°/90°/0°/90° orientation.

When ready to form the end use composite, the roll is unwound and the separation material stripped away. The multi-ply sub-assembly is then sliced into discrete sheets, stacked in multiple plies and then molded in order to form the finished shape and cure the matrix resin, as is described hereinbelow.

The resin matrix for the fibers in the fibrous layers is a thermoplastic polyurethane resin. The polyurethane resin may be a homopolymer or copolymer, and blends of one or more of these resins may also be employed herein. Such resins are known in the art and are commercially available. Preferably, such resins are provided in an aqueous system for ease of use. These resins are typically available as aqueous solutions, dispersions or emulsions, in which the solids component may range from about 20 to about 80 percent by weight, more preferably from about 40 to about 60 percent by weight, with the remaining weight being water. Such resin compositions are disclosed in commonly assigned copending U.S. patent application Ser. No. 11/213,253. Conventional additives, such as fillers and the like, may be included in the resin composition.

The proportion of the resin matrix material to fiber in the composite layers may vary widely depending upon the end use. The polyurethane resin, on a solids basis, preferably forms about 1 to about 40 percent by weight, more preferably from about 10 to about 30 percent by weight, and most preferably from about 15 to about 28 percent by weight, of each composite layer.

Preferably the same thermoplastic polyurethane resin is employed in at least two of the fibrous layers, and more preferably in all of the fibrous layers.

The method of this invention includes forming such composite materials of this invention may be formed from individual laminae by consolidating under high pressure. The pressure employed herein is at least about 1500 psi (10.3 MPa), more preferably at least about 2000 psi (13.8 MPa), still more preferably at least about 2500 psi (17.2 MPa) and most preferably at least about 3000 psi (20.7 MPa). The pressures employed herein preferably range from about 1500 psi (10.3 MPa) to about 4000 psi (27.6 MPa). Typical temperatures useful in the method of this invention are, for example, temperatures ranging from about 75 to about 320° F. (24 to 160° C.), more preferably temperatures ranging from about 150 to about 305° F. (66 to 152° C.) and most preferably temperatures ranging from about 220 to about 270° F. (104 to 132° C.).

The composite structure may be molded in any suitable molding apparatus to form the desired structure. Examples of such equipment include hydraulic presses which provide high pressure molding. In one embodiment, the individual fibrous layers are layed up in a molding press and the layers are molded under the above temperatures and high pressures for a suitable period of time, such as from about 0.5 to about 30 minutes, more preferably from about 10 to about 20 minutes.

The number of layers in the composite material depends on the particular end use. Most preferably, each composite is formed from two fibrous layers which are oriented 90° with respect to each other and have been consolidated into a single structure. As mentioned above, alternatively the composite may be formed from two sets of such single structures, such that a total of four layers of fibers are employed; in this case, two of the two-ply consolidated structures are consolidated with one another into a four-ply sub-assembly.

The number of layers of composite used in articles formed therefrom vary depending upon the ultimate use of the article. For example, there may be at least about 40 layers, preferably at least about 150 layers, and preferably in the range of about 40 to about 400 layers, of the two-ply sub-assemblies that are used to mold the desired product. The molded articles can have any desired shape. For use in vests and the like, preferably the layers are molded into a relatively flat configuration. Similarly, for ballistic panels, the layers are preferably molded into a substantially flat configuration. For other articles, such as helmets and the like, the layers are molded into the desired shape of the end product. The molded articles can be employed as hard or flexible armor as desired, depending on the molding conditions.

The molded articles can be combined with other rigid, flexible and/or molded articles to provide particularly desirable ballistic and other properties. Such articles may be formed from aramid and/or other high tenacity fibers, using the same or different matrix resin as used herein, or from other materials.

One or more plastic films can be included in the composite to permit different composite layers to slide over each other for ease of forming into a body shape and ease of wearing. These plastic films may typically be adhered to one or both surfaces of each composite. Any suitable plastic film may be employed, such as films made of polyolefins. Examples of such films are linear low density polyethylene (LLDPE) films, ultrahigh molecular weight polyethylene (WPE) films, polyester films, nylon films, polycarbonate films and the like. These films may be of any desirable thickness. Typical thicknesses range from about 0.1 to about 1.2 mils (2.5 to 30 µm), more preferably from about 0.2 to about 1 mil (5 to 25 µm), and most preferably from about 0.3 to about 0.5 mils (7.5 to 12.5 µm). Most preferred are films of LLDPE. The films may be formed as part of each subassembly, or films may be introduced between sub-assemblies when placed in the mold. The films may be on one or both sides of the sub-assemblies and/or final molded product.

Various constructions are known for fiber-reinforced composites used in impact and ballistic resistant articles. These composites display varying degrees of resistance to penetration by high speed impact from projectiles such as bullets, shrapnel and fragments, and the like. Examples of such constructions are disclosed, for example, in U.S. Pat. Nos. 6,268,301, 6,248,676, 6,219,842; 5,677,029; 5,471,906; 5,196,252; 5,187,023; 5,185,195; 5,175,040; and 5,167,876.

In one embodiment of the invention, a vest or other body armor or other article is formed in a conventional manner from a plurality of layers of the composite material. These layers preferably are not laminated together but may be stitched together to avoid slippage of the individual plies with respect to each other. For example, the layers may be tack stitched at each corner. Alternatively, the layers may be encased as a whole in a pocket or other covering.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percentages are by weight, unless otherwise stated.

EXAMPLES

Example 1

A two-ply non-woven composite was formed from layers of aramid fiber having a denier of 1000 and a tenacity of 26 g/d (Twaron® T2000 from Teijin). Unitapes were prepared by passing the aramid fibers from a creel and through a combing station to form a unidirectional network. The fiber network was then placed on a carrier web and the fibers were coated with a matrix resin. The resin was a dispersion of a thermoplastic polyurethane resin, namely a copolymer mix of polyurethane resins in water (40-60% resin) which is described by the manufacturer as having a relative density of 1.05 g/cc at 23° C. and a viscosity of 40 cps at 23° C.

The coated fiber network was then passed through an oven to evaporate the water in the composition and was wound up on a roller, with the carrier web stripped therefrom, in preparation for forming the composite material. The resulting structure contained 16 weight percent of the polyurethane resin. Two continuous rolls of unidirectional fiber prepregs were prepared in this manner. Two such unitapes were cross-plied at 90° and consolidated to create a laminate with two identical aramid fiber laminae. Panels of this material measuring 12×12 in. (30.5×30.5 cm) were used to form a multi-layer composite structure.

A total of 270 layers of the 2-ply construction were placed into a matched die mold of a hydraulic press and molded at 240° F. (115.6° C.) at a molding pressure of 1500 psi (10.3 MPa) for a period of 20 minutes. The laminate that was formed had a substantially flat configuration. After molding, the laminate was allowed to cool to room temperature.

The ballistic characteristics of multiple layers of the 4-ply composite were determined. The bullet was a NATO ball (also known as a M80 ball), the size of which was 7.62×51 mm. This projectile is a high energy rifle bullet. The ballistic resistance was determined in accordance with NIJ Standard NIJ 0101.04. The results are shown in Table 1, below.

The V50 calculation was determined based on the average of 6-10 pairs of bullets stopped on the shoot pack and penetrated the shoot pack. V50 velocity is that velocity for which the projectile has a 50% probability of penetration.

Comparative Example 2

Example 1 was repeated, except that the molding pressure was 500 psi (3.4 MPa). The samples were again tested for their ballistic resistance using the same type of bullet, and the results are shown in Table 1, below.

Example 3

Example 1 was repeated, except that a total of 315 layers of the composite was used to form the panels. The samples were again tested for their ballistic resistance using the same type of bullet, and the results are shown in Table 1, below.

Comparative Example 4

Example 3 was repeated, except that the molding pressure was 500 psi. The samples were again tested for their ballistic resistance using the same type of bullet, and the results are shown in Table 1, below.

Example 5

Example 1 was repeated, except that a total of 360 layers of the composite was used to form the panels. The samples were again tested for their ballistic resistance using the same type of bullet, and the results are shown in Table 1, below.

Comparative Example 6

Example 5 was repeated, except that the molding pressure was 500 psi. The samples were again tested for their ballistic resistance using the same type of bullet, and the results are shown in Table 1, below.

TABLE 1

| Example | Molding Pressure, psi (MPa) | Number of Layers | Areal Density, psf (kg/m$^2$) | V50, fps (mps) |
|---|---|---|---|---|
| 1 | 2500 (10.3) | 270 | 6.00 (29.34) | 2740 (835.7) |
| 2* | 500 (3.4) | 270 | 6.00 (29.34) | 2560 (780.8) |
| 3 | 2500 (10.3) | 315 | 7.00 (34.23) | 3012 (918.7) |
| 4* | 500 (3.4) | 315 | 7.00 (34.23) | 2828 (862.5) |
| 5 | 2500 (10.3) | 360 | 8.00 (39.12) | 3218 (981.5) |
| 6* | 500 (3.4) | 360 | 8.00 (39.12) | 3060 (933.3) |

*= comparative example

As can be seen from the above data, when the matrix resin was a polyurethane copolymer and the composite was molded at a high pressure (2500 psi (17.2 MPa)) as per Example 1, the ballistic resistance substantially better than using the same matrix resin but molding at a low pressure as per Comparative Example 1. This result was consistent when the number of layers was increased from 270 to 315 to 360 as indicated in the examples. Furthermore, it can be seen that a fewer number of layers of the composite formed in accordance with the invention can be employed to obtain similar ballistic properties than with a larger number of layers which were molded under low pressure. As a result, the weight of the composite that is molded under high pressures can be decreased, without sacrificing ballistic properties.

Comparative Examples 7-9

In Example 7, Example 1 was repeated, except that the matrix resin was Kraton® D1107 styrene-isoprene-styrene block copolymer thermoplastic elastomer and the resin content of the composite layers was 20% by weight. A total of 250 layers of the 2-ply pre-assembly was used to form the test panels, which were molded at 250° F. (121.1° C.) for 30 minutes at a molding pressure of 200 psi (1.4 MPa). The samples tested for their ballistic resistance using the same type of bullet under MIL-STD-662-F. The results are shown in Table 2, below.

In Example 8, Example 7 was repeated, except that the molding pressure was 2000 psi (13.8 MPa). The samples were tested for their ballistic performance using the same type of bullet, and the results are shown in Table 2, below.

In Example 9, Example 7 was repeated, except that the molding pressure was 4000 psi (27.6 MPa). The samples were tested for their ballistic performance using the same type of bullet, and the results are shown in Table 2, below.

TABLE 2

| Example | Molding Pressure, psi (MPa) | Number of Layers | Areal Density, psf (kg/m$^2$) | V50, fps (mps) |
|---|---|---|---|---|
| 7* | 200 (1.4) | 250 | 7.00 (34.23) | 3217 (981.2) |
| 8* | 2000 (13.8) | 250 | 7.00 (34.23) | 3383 (1031.8) |
| 9* | 4000 (27.6) | 250 | 7.00 (34.23) | 3225 (983.6) |

*= comparative example

From Table 2, it can be seen that as the molding pressure increased using a composite having a styrene-isoprene-styrene matrix thermoplastic elastomer resin, the ballistic properties were not substantially improved. Thus, the substantial improvement in ballistic properties seen with composites that are formed under high pressure and which utilize the polyurethane matrix are not found in composites which used a thermoplastic elastomer matrix resin.

Comparative Examples 10 and 11

In Example 10, Example 7 was repeated, except that the matrix resin was an epoxy vinylester resin (Derkane 411) The resin content of the composite layers was also 20% by weight. A total of 250 layers of the 2-ply pre-assembly was used to form the test panels, which were molded at 200° F. (93.3° C.) for 30 minutes at a molding pressure of 200 psi (1.4 MPa). The samples tested for their ballistic resistance using the same type of bullet, and the results are shown in Table 3, below.

In Example 11, Example 10 was repeated, except that the molding pressure was 889 psi (6.1 MPa). The samples were tested for their ballistic performance using the same type of bullet, and the results are shown in Table 3, below.

TABLE 3

| Example | Molding Pressure, psi (MPa) | Number of Layers | Areal Density, psf (kg/m$^2$) | V50, fps (mps) |
|---|---|---|---|---|
| 10* | 200 (1.4) | 250 | 7.00 (34.23) | 2362 (720.4) |
| 11* | 889 (6.1) | 250 | 7.00 (34.23) | 2404 (732.6) |

*= comparative example

Comparative Examples 10 and 11 Table 3 likewise illustrate that substantial improvements in ballistic properties are not obtained when the molding pressure is increased in composites which employ another conventional matrix resin (epoxy vinylester).

Comparative Examples 12 and 13

In Example 12, Example 10 was repeated, except that the total number of layers was 36. The samples were tested for their ballistic performance using a 9 mm handgun bullet with full metal jacket. The molding pressure was again 200 psi (1.4 MPa). The ballistic results are shown in Table 4, below.

In Example 13, Example 12 was repeated, except that the molding pressure was 889 psi (6.1 MPa). The samples were tested for their ballistic performance using a 9 mm handgun bullet with full metal jacket, and the results are shown in Table 4, below.

TABLE 4

| Example | Molding Pressure, psi (MPa) | Number of Layers | Areal Density, psf (kg/m$^2$) | V50, fps (mps) |
|---|---|---|---|---|
| 12* | 200 (1.4) | 36 | 1.00 (4.89) | 1522 (464.2) |
| 13* | 889 (6.1) | 36 | 1.00 (4.89) | 1502 (458.1) |

*= comparative example

Comparative Examples 12 and 13 similarly show that that substantial improvements in ballistic properties are not obtained when the molding pressure is increased in composites which employ another conventional matrix resin (epoxy vinylester) in which the number of layers is decreased. The ballistic improvement is not seen with higher pressures with a handgun bullet.

Example 14

The aramid ballistic materials of this invention were tested to determine their structural properties. Panels of the same size were formed as in Example 1 under similar conditions, except that the molding pressure was 1500 psi (10.3 MPa). A total of 45 layers were molded and samples measuring 1 inch (2.54 cm) by 6 inch (15.24 cm) were cut from the panels. The structural properties were determined in accordance with ASTM D790, and the results are shown in Table 5, below.

Comparative Example 15

Example 14 was repeated, except that the molding pressure was 150 psi (1.0 MPa). The structural properties were determined in accordance with ASTM D790, and the results are shown in Table 5, below.

TABLE 5

| Example | Molding Pressure, psi (MPa) | Flexural Strength, 1000 psi (MPa) | Flexural Modulus, 1000 psi (MPa) | Deflection, inch (cm) |
|---|---|---|---|---|
| 14 | 1500 (10.3) | 2.16 (14.9) | 155.3 (1070) | 2.61 (6.63) |
| 15* | 150 (1.0) | 1.60 (11.0) | 100.3 (691) | 2.47 (6.27) |

*= comparative example

As can be seen from Table 5, the aramid fiber composites employing the polyurethane matrix resin of this invention that are molded under high pressure are stronger than similar composites that are molded under low pressure. Thus, this invention provides aramid fiber composites that have improved ballistic properties as well as improved mechanical properties.

Accordingly, it can be seen that the present invention provides a method of making aramid composite ballistic structures that have improved ballistic properties, such as ballistic resistance to high energy rifle bullets, when molded under high pressures as compared with structures that are molded under low pressure. In addition, the same improvements are not seen with the use of other matrix resins.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A method of making a ballistic resistant composite panel having improved resistance to high energy rifle bullets that have an energy level of at least about 1500 joules, said method comprising: providing at least one fibrous layer comprising a network of high tenacity aramid fibers; coating the fibrous layer with a thermoplastic polyurethane resin, said polyurethane resin comprising a copolymer mix of polyurethane resins in water, said copolymer mix comprising more than one polyurethane copolymer resin; and molding the fibrous layer at a pressure of at least about 1,500 psi (10.3 MPa) to thereby form said ballistic resistant composite panel, whereby said ballistic resistant composite panel has a ballistic resistance and strength greater than that of a panel formed from the same composition of said aramid fibers and said copolymer mix of polyurethane resins but that is molded under a pressure of 500 psi, and wherein said ballistic resistance is measured against rifle bullets that have an energy level of at least about 1500 joules.

2. The method of claim 1 wherein at least two fibrous layers are provided, each of said fibrous layers comprising a network of high tenacity aramid fibers, and said method further comprises coating each of said fibrous layers with said thermoplastic polyurethane resin, and molding said fibrous layers at a pressure of at least about 1,500 psi (10.3 MPa).

3. The method of claim 2 wherein said fibrous layers are molded at a pressure of at least about 2000 psi (13.8 MPa).

4. The method of claim 2 wherein said fibrous layers are molded at a pressure of at least about 3000 psi (20.7 MPa).

5. The method of claim 2 wherein said fibrous layers are molded at a temperature of from about 75 to about 320° F. (24 to 160° C.).

6. The method of claim 2 wherein said thermoplastic polyurethane resin is present in an amount from about 1 to about 40 percent by weight of the total weight of the composite, and wherein said molding step comprises providing said two fibrous layers as a pair of layers and molding at least about 40 layers of said pair of layers to form said composite.

7. The method of claim 2 wherein said thermoplastic polyurethane resin is present in an amount from about 10 to about 30 percent by weight of the total weight of the composite, and wherein said molding step comprises molding at least about 150 layers of said pair of layers to form said composite.

8. The method of claim 2 wherein adjacent fibrous layers are cross-plied with respect to one another.

9. The method of claim 8 wherein each of said fibrous layers comprise a non-woven fabric in which said fibers are arranged unidirectionally in each layer.

10. The method of claim 9 wherein said thermoplastic polyurethane resin is applied to said fibrous layers as a dispersion in water, and has a relative density of 1.05 g/cc at 23° C. and a viscosity of 40 cps at 23° C.

11. The method of claim 10 wherein said fibrous layers are cross-plied at 90° to each other, and wherein said thermoplastic polyurethane resin is present in an amount from about 15 to about 28 percent by weight of the total weight of the composite.

12. The method of claim 2 further comprising at least one plastic film in contact with at least one of said fibrous layers.

13. A method for making a ballistic resistant composite panel having improved resistance to high energy rifle bullets, said method comprising: providing a first fibrous layer comprising a network of high tenacity aramid fibers; coating said first fibrous layer with a first thermoplastic polyurethane resin, said first polyurethane resin comprising a copolymer mix of polyurethane resins in water, said copolymer mix of said first polyurethane resin comprising more than one polyurethane copolymer resin; providing a second fibrous layer comprising a network of high tenacity aramid fibers; coating said second fibrous layer with a second thermoplastic polyurethane resin, said second polyurethane resin comprising a copolymer mix of polyurethane resins in water, said copolymer mix of said second polyurethane resin comprising more than one polyurethane copolymer resin; and molding said first and second fibrous layers at a pressure of at least about 1,500 psi (10.3 MPa) to thereby form said ballistic resistant composite panel, whereby said ballistic resistant composite panel has a ballistic resistance and strength greater than that of a panel formed from the same composition of said aramid fibers and said copolymer mix of polyurethane resins but that is molded under a pressure of 500 psi, and wherein said ballistic resistance is measured against rifle bullets that have an energy level of at least about 1500 joules.

14. The method of claim 13 wherein each of said fibrous layers comprise a non-woven fabric.

15. The method of claim 14 wherein said fibers in each of said first and second fibrous layers are arranged unidirectionally in each layer, and wherein said molding step comprises providing said first and second fibrous layers as a pair of layers and molding at least about 150 layers of said pair of layers to form said composite.

16. The method of claim 15 wherein said fibrous layers are cross-plied at 90° to each other, and wherein said thermoplastic polyurethane resin is applied to said fibrous layers as a dispersion in water, and has a relative density of 1.05 g/cc at 23° C. and a viscosity of 40 cps at 23° C.

17. The method of claim 14 wherein said fibrous layers are molded at a pressure of at least about 2000 psi (13.8 MPa).

18. The method of claim 14 wherein said fibrous layers are molded at a pressure of at least about 3000 psi (20.7 MPa).

19. The method of claim 14 wherein said fibrous layers are molded at a temperature of from about 75 to about 320° F. (24 to 160° C.).

20. The method of claim 16 wherein said first and second thermoplastic polyurethane resins are present in an amount from about 1 to about 40 percent by weight of the total weight of the each of said layers.

21. The method of claim 20 wherein said first and said second thermoplastic polyurethane resins are the same polyurethane resin.

22. The method of claim 21 wherein said fibers in said first and second fibrous layers have a tenacity of at least about 20 g/d.

23. The method of claim 22 wherein said fibers in said first and second fibrous layers have a denier of from about 200 to about 3000.

24. The method of claim 22 further comprising at least one plastic film in contact with at least one of said fibrous layers.

25. A method for making a ballistic resistant composite panel having improved resistance to high energy rifle bullets, said method comprising: providing a first non-woven fibrous layer comprising a network of high tenacity aramid fibers; coating said first non-woven fibrous layer with a first thermoplastic polyurethane resin, said first polyurethane resin comprising a copolymer mix of polyurethane resins in water, said copolymer mix of said first polyurethane resin comprising more than one polyurethane copolymer resin; providing a second non-woven fibrous layer comprising a network of high tenacity aramid fibers; coating said second non-woven fibrous layer with a second thermoplastic polyurethane resin, said second polyurethane resin comprising a copolymer mix of polyurethane resins in water, said copolymer mix of said second polyurethane resin comprising more than one polyurethane copolymer resin; arranging said first and second non-woven fibrous layers such that said first and second non-woven fibrous are oriented with respect to each other; and molding the first and second fibrous layers at a pressure of at least about 1,500 psi (10.3 MPa) to thereby form said ballistic resistant composite panel, whereby said ballistic resistant composite panel has a ballistic resistance and strength greater than that of a panel formed from the same composition of said aramid fibers and said copolymer mix of polyurethane resins but that is molded under a pressure of 500 psi, and wherein said ballistic resistance is measured against rifle bullets that have an energy level of at least about 1500 joules.

26. The method of claim 25 wherein said fibrous layers are molded at a pressure of at least about 2000 psi (13.8 MPa), wherein said fibers in each of said first and second fibrous layers are arranged unidirectionally in each layer, and wherein said fibrous layers are cross-plied at 90° to each other, and wherein said molding step comprises providing said first and second fibrous layers as a pair of layers and molding at least about 150 layers of said pair of layers to form said composite.

27. The method of claim 26 wherein said first and second thermoplastic polyurethane resins are present in an amount from about 10 to about 30 percent by weight of the total weight of the each of said layers, and wherein said thermoplastic polyurethane resin is applied to said fibrous layers as a dispersion in water, and has a relative density of 1.05 g/cc at 23° C. and a viscosity of 40 cps at 23° C.

28. The method of claim 25 wherein said molding step comprises providing two sets of a pair of said first and second fibrous layers that are cross-plied with respect to each other to form a 4 ply laminate, and molding at least about 150 layers of said 4 ply laminate to form said composite.

* * * * *